United States Patent
Bell, Jr. et al.

(10) Patent No.: US 7,870,337 B2
(45) Date of Patent: Jan. 11, 2011

(54) POWER-AWARE LINE INTERVENTION FOR A MULTIPROCESSOR SNOOP COHERENCY PROTOCOL

(75) Inventors: Robert H. Bell, Jr., Austin, TX (US); Louis B. Capps, Jr., Georgetown, TX (US); Thomas E. Cook, Essex Junction, VT (US); Michael J. Shapiro, Austin, TX (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/946,249

(22) Filed: Nov. 28, 2007

(65) Prior Publication Data

US 2009/0138660 A1 May 28, 2009

(51) Int. Cl.
*G06F 13/00* (2006.01)
*G06F 13/28* (2006.01)
*G01R 21/00* (2006.01)
*G01R 21/06* (2006.01)
*G01R 19/00* (2006.01)

(52) U.S. Cl. ............... 711/118; 711/154; 711/E12.041; 702/60; 702/64

(58) Field of Classification Search .............. 711/118, 711/154, E12.041; 702/60, 64
See application file for complete search history.

(56) References Cited

U.S. PATENT DOCUMENTS

| | | | |
|---|---|---|---|
| 5,502,838 A * | 3/1996 | Kikinis ...................... 713/501 |
| 5,530,932 A | 6/1996 | Carmean et al. ............. 395/750 |
| 5,669,003 A | 9/1997 | Carmean et al. ........ 395/750.04 |
| 5,732,215 A * | 3/1998 | Boutaghou et al. ............. 710/74 |
| 5,809,314 A | 9/1998 | Carmean et al. ........ 395/750.04 |
| 6,738,675 B2 | 5/2004 | Dai ............................. 700/22 |
| 6,826,656 B2 | 11/2004 | Augsburg et al. ........... 711/144 |
| 7,043,405 B2 | 5/2006 | Orenstien et al. ........... 702/188 |
| 2003/0158697 A1* | 8/2003 | Gold et al. ................... 702/132 |
| 2006/0289862 A1* | 12/2006 | Yoshida et al. ................. 257/48 |
| 2007/0079216 A1 | 4/2007 | Bell, Jr. et al. .............. 714/763 |
| 2008/0288123 A1* | 11/2008 | Krishnan et al. ............. 700/295 |

OTHER PUBLICATIONS

David A. Patterson, Lecture 18: Snooping vs. Directory Based Coherency, 1996.*

* cited by examiner

*Primary Examiner*—Shane M Thomas
*Assistant Examiner*—Edward J Dudek, Jr.
(74) *Attorney, Agent, or Firm*—Hamilton & Terrile, LLP; Michael Rocco Cannatti

(57) ABSTRACT

A snoop coherency method, system and program are provided for intervening a requested cache line from a plurality of candidate memory sources in a multiprocessor system on the basis of the sensed temperature or power dissipation value at each memory source. By providing temperature or power dissipation sensors in each of the candidate memory sources (e.g., at cores, cache memories, memory controller, etc.) that share a requested cache line, control logic may be used to determine which memory source should source the cache line by using the power sensor signals to signal only the memory source with acceptable power dissipation to provide the cache line to the requester.

20 Claims, 4 Drawing Sheets

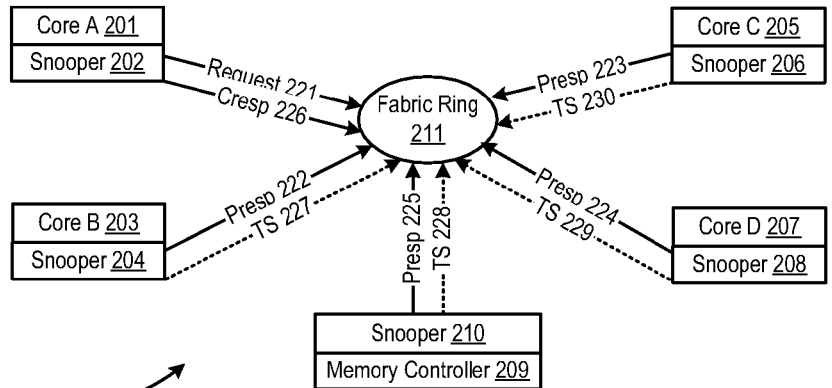

*Figure 2*

| Table 1: Partial Response (Presp) from snooper N in response to request from master including the snooper N core's Thermal signal T ||||| 
|---|---|---|---|---|
| Request to all snoopers | Current line directory state in snooper N | Snooper N's thermal signal T={L, H} | Snooper N's Presp Out | New line directory state in snooper N after cresp sent to snooper N |
| read | i (invalid) | T | N:i-T | i |
|  | s (shared) | T | N:s-T | s |
|  | m (modified) | T | N:m-T | i |
|  | e (exclusive) | T | N:e-T | s |
| write | i | T | N:i-T | i |
|  | s | T | N:s-T | i |
|  | m | T | N:m-T | i |
|  | e | T | N:e-T | i |

*Figure 3*

| Table 2: Combined Response (Cresp) from Master in response to Presps from snoopers including thermal signals from snoopers ||||
|---|---|---|---|
| Request to all snoopers | Presp from Snooper N | Master's Cresp Out to snooper N and other snoopers | New line directory state in master after data returned |
| Read | N:i-T | MC_send_data | e |
| | N:s-T | Over all N:s-T, if a T="L", N:s_send_data<br>Else MC_send_data (all N:s_go_i) | s (e) |
| | N:m-T | N:m_send_data_go_i | m |
| | N:e-T | For N:e-T, if T="L", N:e_send_data_go_s<br>Else MC_send_data, N:e_go_s (i) | s (e) |
| Write if i locally.<br>Dclaim if s locally.<br>(No request if m or e locally; master gets data from self if s, m, e locally.) | N:i-T | Write: MC_send_data | e |
| | N:s-T | Over all N:s, if a T="L", N:s_send_data_go_i,<br>Else MC_send_data, all N:s go_i | e |
| | N:m-T | N:m_send_data_go_i | m |
| | N:e-T | Over all N:e-T, if T="L", N:e_send_data_go_i<br>Else MC_send_data, N:e_go_i | e |

*Figure 4*

POWER-AWARE LINE INTERVENTION FOR A MULTIPROCESSOR SNOOP COHERENCY PROTOCOL

BACKGROUND OF THE INVENTION

1. Field of the Invention

The present invention is directed in general to the field of data processing systems. In one aspect, the present invention relates to cache memory management within multiprocessor systems.

2. Description of the Related Art

In multi-processor computer systems having one or more levels of cache memory at each processor, cache coherency is typically maintained across such systems using a snoop protocol or a directory-based protocol. Where a snoop protocol is used to provide system coherency for cache lines with existing multi-processor systems, there is a large amount of sharing of cache lines, upwards of 30% of all requests in some cases. This may be understood with reference to a multi-core system, such as the POWER5/6 which uses a snoop protocol to maintain coherency. In such a system, lines requested for a read operation by a first core that are already being accessed (for either reads or previously for writes) by a second core can be marked as shared in the second core, forwarded or intervened to the first core, and also marked as shared in the first core. Both cores then access the shared lines for reads in parallel, without further communication. This protocol can result in multiple cores sharing the same line so that when another core attempts to access (for read shared or exclusive) a line that is already shared by two or more cores, a choice must be made of which core provides the shared copy. A typical cache allocation model would provide the line based on some centralized control heuristic such as, for example, deciding that the core physically closest to the requesting core could provide the line. In some implementations, a specific core's version of the shared line is marked as the shared copy that will be provided for future requests, thereby reducing the time required to access the cache line.

While memory access speed has historically been a key design objective, in today's multiprocessors, power dissipation is an increasingly important design constraint that must be considered, especially when the power dissipation can be different at each core in a multiple heterogeneous core system, or when homogeneous cores not being utilized symmetrically, the power dissipation can be different at each core. In addition, power dissipation (and hence core temperature) can increase when some level of the cache hierarchy (e.g., the L2 cache in a first processing unit) is accessed to intervene shared lines to other cores or to an L2 cache in another processing unit. As will be appreciated, such power dissipation occurs when powering up the control or the sub-arrays of the cache, when reading the line out of the cache, and when forwarding the line across a bus to the requesting core. In some cases, one or more of the cores and their associated cache hierarchies may be dissipating significant power, and it can also be the case that all of the cores are "hot" when they are all dissipating significant power.

While attempts have been made to control the "hot core" problem, such as powering down a "hot" core, such solutions do not provide a mechanism for coherently sourcing a cache line to a requesting core, and otherwise impose an undue limit on the processing capability by powering down the hot core(s). Accordingly, there is a need for a system and method for controlling the effects of power dissipation in a multiprocessor system by efficiently and quickly sourcing cache lines to a requesting core. In addition, there is a need for a multi-core system and method to provide system coherency for cache line requests which takes into account the power consumption status of individual cores. Further limitations and disadvantages of conventional cache sourcing solutions will become apparent to one of skill in the art after reviewing the remainder of the present application with reference to the drawings and detailed description which follow.

SUMMARY OF THE INVENTION

A power-aware line intervention system and methodology are provided for a multiprocessor system which uses a snoop coherency protocol wherein requested cache lines are sourced from a plurality of memory sources on the basis of the sensed temperature or power dissipation at each memory source. By providing temperature or power dissipation sensors in each of a plurality of memory sources (e.g., at cores, cache memories, memory controller, etc.) that share a requested line, control logic may be used to determine which memory source should source the line by using the power sensor signals to signal only the memory source with acceptable power dissipation to provide the line to the requester. In selected embodiments, core temperature sensors, such as a diode, are positioned and integrated within individual memory sources to provide signals to the control heuristic to indicate a particular core or memory controller should be disqualified from providing a line to a requesting core, though without necessarily powering down the high-power core. For example, if two cores each shared a requested line in their respective cache memories, the core that is physically close to the requester would then provide a copy of the line only if it is not already at maximum threshold with respect to power. Otherwise, the line would be provided by another sharing core or the memory controller buffers. When a snoop protocol system is used to maintain cache coherency, the power sensor signals may be used whether the requesting core wants the line shared or exclusive. In selected implementations of a snoop protocol system, if the line is requested exclusive, the control logic may cause the higher-power cores to invalidate their copies of the line, so that the requested cache line would be sourced from the lower-power core or memory controller.

In accordance with various embodiments, a requested cache line may be intervened in a multiprocessor data processing system under software control using the methodologies and/or apparatuses described herein, which may be implemented in a data processing system with computer program code comprising computer executable instructions. In whatever form implemented, a request for a first cache line is generated during operation of the multiprocessor data processing system. In response, one or more memory sources (e.g., at cores, cache memories, memory controller, etc.) which store a copy of the requested first cache line are identified. In addition, temperature or power dissipation values for each of the plurality of memory sources are collected, such as by monitoring a sensor at each memory source for measuring a temperature or power dissipation value associated with said memory source. Based on the collected temperature or power dissipation values, a first memory source is selected from the plurality of memory sources to intervene the requested first cache line, where the first memory source is selected at least in part based on having an acceptable temperature or power dissipation value. For example, the first memory source may be selected by selecting memory source having a first temperature or power dissipation value that is lower than a second temperature or power dissipation value associated with another memory source. By comparing a first temperature or power dissipation value that is associated with the first memory source to one or more other temperature or power dissipation values associated with one or more other memory sources, a cool memory source is thereby selected. On the other hand, if none of the plurality of cache memories has an acceptable temperature or power dissipation value, a memory controller having an acceptable temperature or power dissipation value is selected to intervene the requested first cache line. To implement a snoop coherency protocol, a first memory source is selected by assembling at a master processor a plurality of partial responses and temperature values from each of the plurality of memory resources, selecting the first memory source having a temperature value that is lower than at least one of the other memory sources, and then broadcasting from the master core a selection message to instruct the first memory source to intervene the requested first cache line to the master core.

BRIEF DESCRIPTION OF THE DRAWINGS

Selected embodiments of the present invention may be understood, and its numerous objects, features and advantages obtained, when the following detailed description is considered in conjunction with the following drawings, in which:

FIG. 2 illustrates in simplified form the signal flow between various memory components in a multi-processor system which implements power-aware line intervention in a snoop coherency protocol for monitoring cache consistency;

FIG. 3 is an example table listing of thermal signals and partial responses provided by each core in response to a read or write request from a master core in accordance with selected snoop coherency protocol embodiments of the present invention;

FIG. 4 is an example table listing of combined responses provided by the master core in response to the partial responses listed in FIG. 3.

DETAILED DESCRIPTION

Figure 1:
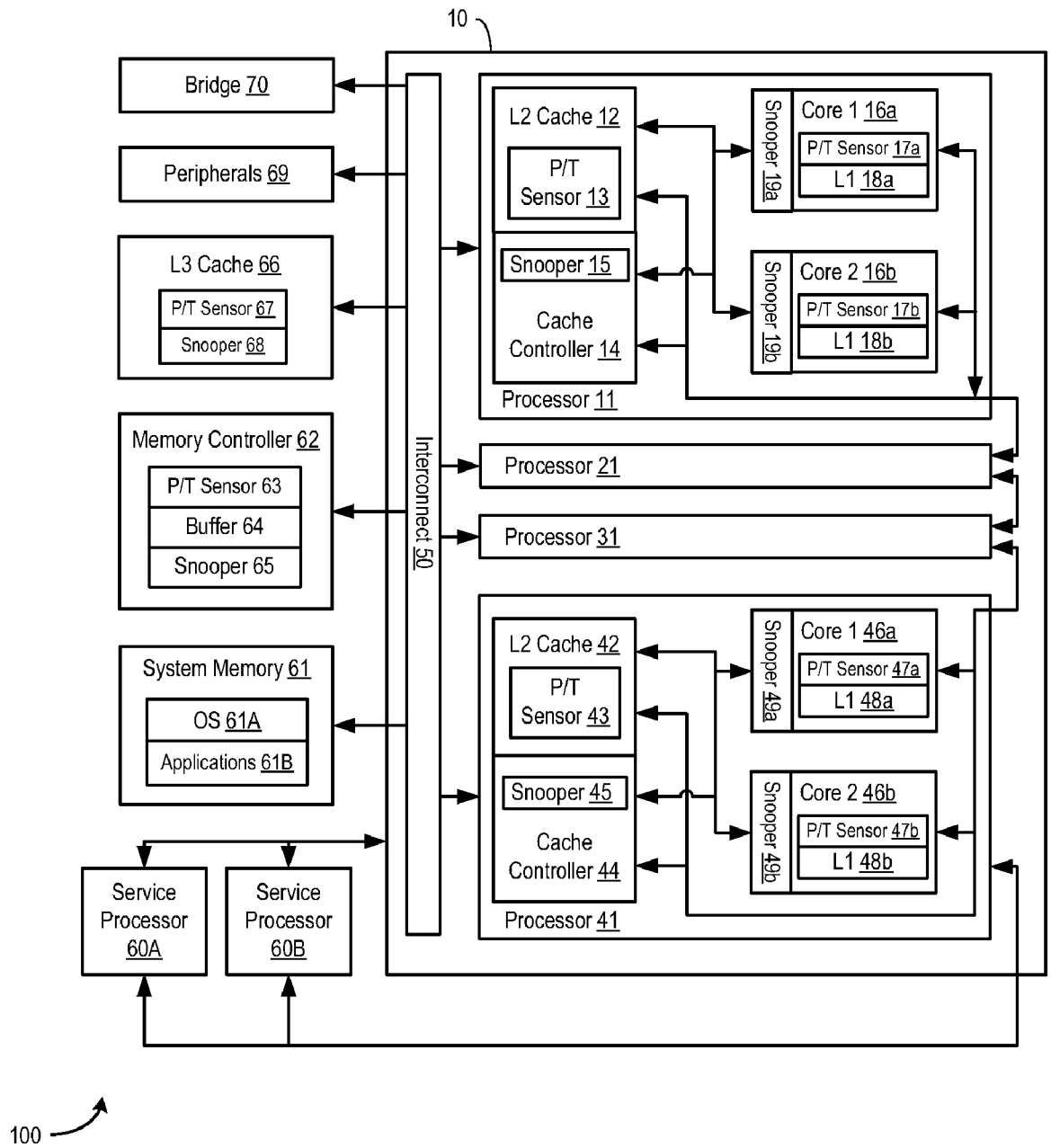
FIG. 1 illustrates a symmetric multi-processor computer architecture in which selected embodiments of the present invention may be implemented.

A snoop coherency protocol method, system and program are disclosed for coherently sourcing cache lines to a requesting core from a plurality of sources that each share the requested cache line on the basis of temperature and/or power signals sensed at each source so that only the source with an acceptable power dissipation or temperature is signaled to provide the requested line. To sense the temperature or power dissipation at each core of a multi-core chip, a diode is placed at each core on the chip as a temperature sensor. Where the diode output voltage will vary from 0.5-1.0V for a typical temperature range of 20 to 100 C, the output voltage is monitored and can be stored in a register for use by a control heuristic to select the source core from the cores having a temperature below a predetermined threshold. The disclosed techniques can be used in connection with a snoop coherency protocol to source cache lines on a multiprocessor chip. With a snoop protocol, every request from a core for a line (such as a cache line read) causes the other cores in the multiprocessor to check, or snoop, their caches for the same line. The other cores respond to the request by submitting a partial response to indicate the status of the requested line at the core (e.g., invalid, shared, exclusive or modified). As part of the partial response or separately, each of the cores also provides a power dissipation or temperature signal, so that each core is aware of the other core's power or temperature status. If the line exists in one or more caches, then the responses are combined by the requesting core (or master) into a combined-response using control logic to determine which low-power or low temperature cache will intervene the line to the requesting core based on the partial responses. To the extent that each core uses the control logic to assemble combined-responses whenever requesting a cache line, the control logic may be referred to as a centralized control logic. The combined-response is then broadcast to all the cores to signal one of the cores that it should intervene the line, and to update the cache line status information at the other core(s). The centralized control logic selects which core will return the line and signals that core to intervene the line to the requestor based on the temperature and/or power signals sensed at each core so that only the core with an acceptable power dissipation or temperature is signaled to provide the requested line. As described more fully below, the term "core" as used herein refers to an individual processor's core logic, the L1 cache, the L2 cache and/or an L3 cache associated therewith. Various illustrative embodiments of the present invention will now be described in detail with reference to the accompanying figures. It will be understood that the flowchart illustrations and/or block diagrams described herein can be implemented in whole or in part by dedicated hardware circuits, firmware and/or computer program instructions which are provided to a processor of a general purpose computer, special purpose computer, or other programmable data processing apparatus to produce a machine, such that the instructions (which execute via the processor of the computer or other programmable data processing apparatus) implement the functions/acts specified in the flowchart and/or block diagram block or blocks. In addition, while various details are set forth in the following description, it will be appreciated that the present invention may be practiced without these specific details, and that numerous implementation-specific decisions may be made to the invention described herein to achieve the device designer's specific goals, such as compliance with technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present invention will now be described in detail below with reference to the figures.

Referring to FIG. 1, a diagram depicts an example architecture of a symmetric multi-processor computer system 100 in which selected embodiments of the present invention may be implemented. The computer system 100 has one or more processing units arranged in one or more processor groups, and as depicted, includes four processing units 11, 21, 31, 41 in processor group 10. The processing units communicate with other components of system 100 via a system or fabric bus 50. Fabric bus 50 is connected to one or more service processors 60A, 60B, a system memory device 61, a memory controller 62, a shared or L3 system cache 66, and/or various peripheral devices 69. A processor bridge 70 can optionally be used to interconnect additional processor groups. Though not shown, it will be understood that the computer system 100 may also include firmware which stores the system's basic input/output logic, and seeks out and loads an operating system from one of the peripherals whenever the computer system is first turned on (booted).

Once loaded, the system memory device 61 (random access memory or RAM) stores program instructions and operand data used by the processing units, in a volatile (temporary) state, including the operating system 61A and application programs 61B. In addition, any peripheral device 69 may be connected to fabric bus 50 using any desired bus connection mechanism, such as a peripheral component interconnect (PCI) local bus using a PCI host bridge. A PCI bridge provides a low latency path through which processing units 11, 21, 31, 41 may access PCI devices mapped anywhere within bus memory or I/O address spaces. The PCI host bridge interconnecting peripherals 69 also provides a high bandwidth path to allow the PCI devices to access system memory 61. Such PCI devices may include, for example, a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and/or a graphical pointing device (e.g., mouse) for use with the display device. The service processor(s) 60 can alternately reside in a modified PCI slot which includes a direct memory access (DMA) path.

In a symmetric multi-processor (SMP) computer, all of the processing units 11, 21, 31, 41 are generally identical, that is, they all use a common set or subset of instructions and protocols to operate, and generally have the same architecture. As shown with processing unit 11, each processing unit may include one or more processor cores 16a, 16b which carry out program instructions in order to operate the computer. An exemplary processing unit would be the POWER5™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

As depicted, each processor core 16a, 16b includes an on-board (L1) cache memory 18a, 18b (typically, separate instruction and data caches) that is constructed from high speed memory devices. Caches are commonly used to temporarily store values that might be repeatedly accessed by a processor, in order to speed up processing by avoiding the longer step of loading the values from system memory 61. A processing unit can include another cache such as a second level (L2) cache 12 which, along with a cache memory controller 14, supports both of the L1 caches 18a, 18b that are respectively part of cores 16a and 16b. Additional cache levels may be provided, such as an L3 cache 66 which is accessible via fabric bus 50. Each cache level, from highest (L1) to lowest (L3) can successively store more information, but at a longer access penalty. For example, the on-board L1 caches (e.g., 18a) in the processor cores (e.g., 16a) might have a storage capacity of 128 kilobytes of memory, L2 cache 12 might have a storage capacity of 4 megabytes, and L3 cache 66 might have a storage capacity of 32 megabytes. To facilitate repair/replacement of defective processing unit components, each processing unit 11, 21, 31, 41 may be constructed in the form of a replaceable circuit board, pluggable module, or similar field replaceable unit (FRU), which can be easily swapped, installed in, or swapped out of system 100 in a modular fashion.

As those skilled in the art will appreciate, a cache memory has many memory blocks which individually store the various instructions and data values. The blocks in any cache are divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associatively of the cache. Thus, information is stored in the cache memory in the form of cache lines or blocks, where an exemplary cache line (block) includes an address field, a state bit field, an inclusivity bit field, and a value field for storing the actual program instruction or operand data. The state bit field and inclusivity bit fields are used to maintain cache coherency in a multiprocessor computer system by indicating the validity of the value stored in the cache. The address field is a subset of the full address of the corresponding memory block. A compare match of an incoming address with one of the address fields (when the state field bits designate this line as currently valid in the cache) indicates a cache "hit." The collection of all of the address fields in a cache (and sometimes the state bit and inclusivity bit fields) is referred to as a directory, and the collection of all of the value fields is the cache entry array.

As depicted in FIG. 1, the computer system 100 includes a plurality of memory sources, including the L1 cache memories (e.g., 18a, 18b, 48a, 48b) at each respective core (e.g., 16a, 16b, 46a, 46b), the L2 cache memories (e.g., 12, 42) along with cache memory controllers 14, 44 at each respective processing unit (e.g., 11, 41), the shared L3 cache 66, and the buffer memory 64 at the memory controller 62. In order to use the temperature or power status to source a shared cache line, each memory source includes a temperature or power dissipation sensor which is used to signal its temperature or power status. Thus, a power/temperature sensor (e.g., 17a, 17b, 47a, 47b) is positioned at or within each L1 cache (e.g., 18a, 18b, 48a, 48b). In addition or in the alternative, a power/temperature sensor (e.g., 13, 43) is positioned at or within each L2 cache (e.g., 12, 42), a power/temperature sensor (e.g., 67) is positioned at or within each L3 cache 66, and/or a power/temperature sensor (e.g., 63) is positioned at or within each memory controller 62. In an example embodiment, each power/temperature sensor is formed as a diode which is placed to sense the temperature of the memory source, where the diode output voltage will vary from 0.5-1.0V for a typical temperature range of 20 to 100C. To monitor the temperature for a given memory source, the snooper circuit associated with each memory source includes a storage device (e.g., a register) for storing the diode output voltage. Thus, each core (e.g., 16a, 16b, 46a, 46b) includes its own respective snooper circuit (e.g., 19a, 19b, 49a, 49b) which is used to monitor the power or temperature status information provided by its associated power/temperature sensor (e.g., 17a, 17b). In addition or in the alternative, each processing unit (e.g., 11, 41) includes its own respective snooper circuit (e.g., 15, 45) which is used to monitor the power or temperature status information provided by the L2 cache power/temperature sensor (e.g., 13, 43), the L3 cache 66 includes its own snooper circuit 68 which is used to monitor the power or temperature status information provided by the L3 cache power/temperature sensor 67, and/or the memory controller 62 includes its own snooper circuit 65 which is used to monitor the power or temperature status information provided by the memory controller's power/temperature sensor 63.

Depending upon the coherency protocol used by the computer system 100, the power dissipation or temperature status information obtained from each memory source may be used to select a "cool" memory source to provide a requested cache line that is shared by two or more memory sources, thereby avoiding "overheated" memory sources. In accordance with selected embodiments, the power dissipation or temperature status information is used to provide or intervene a shared cache line in a multi-processor system which implements a snoop coherency protocol. This is depicted in simplified form in FIG. 2, which depicts an example signal flow between various memory components in a multi-processor system 200 which implements power-aware line intervention in a snoop coherency protocol for monitoring cache consistency. In the system 200, a plurality of cores 201, 203, 205, 207 are communicatively coupled together and to a memory controller 209 over a shared interconnect or fabric ring 211. Fabric snoopers 202, 204, 206, 208, 210 are respectively provided at the cores 201, 203, 205, 207 and memory controller 209 to read requests for cache lines from the fabric ring 211 that are generated by a requesting or "master" core. Requests, responses and thermal signals move around the fabric 211 ring in a counter-clockwise direction and are seen by all snoopers. In response to such cache line requests, each snooper generates a partial response to signal the status of the requested cache line its associated core or controller. Each partial response from a snooper may include the thermal signal information being monitored by the snooper, although the thermal signal information may instead be distributed separately to the other snoopers. However distributed, the master core uses the thermal signal information and partial responses to choose a source for the requested cache line by selecting a "cool" core or memory controller as the source. The selected source is identified in a combined response sent by the master core, which instructs the other cores to update their respective state information for the cache line accordingly.

In the example signal flow shown in FIG. 2, a first core 201 is requesting a cache line by sending an initial request 221 to the fabric ring 211. In initiating the request, the first core 201 is treated as the master core. Upon receiving the initial request 221, the other cores 203, 205, 207 and memory controller 209 each generate and send a partial response (Presp) 222-225 to the fabric ring 211. Each Presp message specifies, for its respective memory source, the current line directory state for the requested cache line. For example, assuming the well-known MESI coherency protocol is implemented, if the second core 203 contains a shared copy of the requested cache line, the Presp message 222 from the second core 203 is sent that identifies the specific core and its cache line status (e.g., Core 203: s), where "s" indicates "shared." Likewise, if the third core 205 contains an invalid copy of the requested cache line, the Presp message 223 from the third core 205 is sent that identifies the specific core and its cache line status (e.g., Core 205: i), where "i" indicates "invalid." In similar fashion, if the fourth core 207 contains an exclusive copy of the requested cache line, the Presp message 224 from the fourth core 207 is sent that identifies the specific core and its cache line status (e.g., Core 207: e), where "e" indicates "exclusive." Finally, if the memory controller 209 contains a modified copy of the requested cache line, the Presp message 225 from the memory controller 209 is sent that identifies the memory controller and its cache line status (e.g., MC 209: m), where "m" indicates "modified."

As indicated above, each Presp message from a responding core may also include thermal signal information (T) for that memory source 227-230, although the thermal signal information may also be sent separately. In an example embodiment, the thermal signal information may convey one of two states, such as H or L to signify a "high" or "low" temperature. To generate the thermal signal information, each core's snooper may compare the diode output voltage from the power/thermal sensor to a predetermined threshold voltage, thereby generating a "high" thermal signal level if the diode output voltage exceeds the threshold, and generating a "low" thermal signal level if the diode output voltage does not exceed the threshold. In an example snoop protocol embodiment, an additional thermal signal bit is provided on the snoop bus at partial-response time that comes directly from logic at the core that quantifies whether the core has reached a power dissipation threshold (bit=1, i.e., "hot") or not (bit=0, i.e., "cool"). Additional bits can be used if additional power dissipation levels are required (i.e., very hot, hot, warm, and cool). In addition to signaling thermal information from each responding core, a bit from the memory controller 209 may also be included in its Presp message 225 to signal how "hot" the controller is and if the line is speculative already in the memory controller's buffers. If the memory controller 209 is not "hot" and the line is already buffered, potentially less power could be used to source the line from the memory controller 209 than intervening from a shared L3 cache or L2 cache at one of the cores.

Upon receiving and assembling the Presp messages along with the thermal signal information for each candidate memory source, the master core 201 uses control logic to select which memory source 203, 205, 207, 209 will intervene the line to the master core 201. For example, the thermal signal bit(s) may be fed into the control logic/equations at the master core 201 that determine which sharing core provides the line to the requesting master core. If two cores share the line and one is "cool" and one is "hot", the cool core would source the line. If there are two or more "cool" cores that can source a shared line, any desired tie-breaking rule may be used to select the line source. If there are no "cool" cores that can source the line and the line is unmodified, then the memory controller 209, if "cool," may be chosen to source the line from buffer storage or memory. If a "cool" core stores a modified copy of the requested line, that core is selected to source the line and the source core is then updated to show the cache line as "invalid." Once a memory source is selected, the master core 201 generates and broadcasts a combined response (Cresp) 226 to the fabric ring 211 to notify all of the candidate memory sources 203, 205, 207, 209 which memory source should intervene the requested line. It will be appreciated that, in some cases, the "cool" core can understand from the initial Presp that it receives that it should source the line, and therefore early data from that core may be sourced before Cresp is received, which can improve performance of the system.

In response to the Cresp message 226, each snooper 204, 206, 208 associated respectively with the other cores 203, 205, 207 updates its corresponding line directory state for the requested cache line to reflect any change in status caused by the selection of a source for the requested cache line. For example, if a read request for a cache line is received by a memory source that currently stores an invalid copy of the cache line, then that memory source will not be selected as the source, and the line directory state remains "invalid." But if a read request for a cache line is received by a memory source that currently stores a modified copy of the cache line, the line directory state for the cache line in that memory source is updated as "invalid." And if a read request for a cache line is received by a memory source that currently stores a shared copy of the cache line and that memory source is selected on the basis of the thermal information to intervene the cache line, or if the line state was exclusive in that memory source, then the selected memory source's line directory state for that cache line is updated as "shared." As for requests to write to a cache line not already stored in either exclusive or modified form in the master controller, the line directory state for the cache line stored in any other core is updated as "invalid" in response to receiving the Cresp message.

In similar fashion, the master core 201 updates its own line directory state information for the requested cache line after selecting the memory source and broadcasting the combined response. For example, if a read request for a cache line is intervened from a memory source that currently stores an exclusive or shared copy of the requested cache line, then the line directory state at the master core is updated as "shared" in selected embodiments. In other embodiments, if the Cresp indicates to all sharers to change their cache state to "invalid", the master state may be updated as "exclusive" with data from the memory controller. And if a read request for a cache line is intervened from a memory source that currently stores a modified copy of the requested cache line, then the line directory state at the master core is updated as "modified" and the selected memory source's line directory state for that cache line is updated as "invalid." But if none of the responding cores contain a valid copy of the requested cache line and the requested line is obtained from the memory controller, then the line directory state at the master core is updated as "exclusive." As for requests to write to a cache line not already stored in shared, exclusive or modified form in the master controller, the line directory state for the cache line in the master core is updated as "exclusive" in response to receiving the Cresp message, unless line is stored as a "modified" line in a memory source, in which case the line directory state for the cache line in that master core is updated as "modified."

It will be appreciated that the substance of the foregoing signaling scheme may be implemented as a version of a MESI snoop coherency protocol with a variety of command structures and control logic equations, and yet still provide the power-aware line intervention benefits in a snoop coherency protocol for monitoring cache consistency. As but one example implementation, FIG. 3 provides an example table listing 300 of thermal signals and partial responses provided by each core in response to a read or write request from a master core in accordance with selected snoop coherency protocol embodiments of the present invention. In the first table column, the type of cache line request (e.g., read or write) is specified. In the second column, the current state of the requested cache line detected by the snooper at each memory source is specified as invalid (i), shared (s), modified (m) or exclusive (e). In the third column, the current thermal or power dissipation status detected by the snooper at each memory source is specified as either low (L) or high (H) temperature, though other thermal conditions could be specified. In the fourth column, the snooper's partial-response (based on the values contained in the second and third columns) is represented as a three-part message specifying the responding core or controller (N), the state of the requested cache line at that core/controller (i, s, m, e) and the detected thermal signal state (T). Finally, the fifth column specifies the new line directory state at snooper N after the combined-response message is received from the master controller.

To continue with this example, FIG. 4 provides an example table listing 400 of combined-responses provided by the master core in response to the partial responses listed in FIG. 3. In the first column, the type of cache line request (e.g., read or write) is again specified. In the second column, the partial-responses received from the responding cores and memory controller are specified. In the third column, the combined-response sent by the master core to the other snoopers is specified. In this example, the combined-response is represented as a message that specifies which memory source (e.g., the core or controller) is selected to source the requested line based on the thermal conditions of the various possible message sources. In addition, the combined-response message includes instructions to the non-selected memory sources on how to update their respective cache status directory lines. Finally, the fourth column of the table listing 400 specifies the new line directory state at master core after the requested cache line data is returned.

Thus, a read request, issued if the line does not exist in the cache of the requesting core, that returns "invalid" Presp messages from all snoopers causes the Cresp message to instruct the memory controller to send the data with the "MC_send_data" instruction, as indicated in the first row of the table listing 400. On the other hand, if a plurality of snoopers return a "shared" Presp message (N:s-T), the Cresp message instructs a snooper (N) with a thermal signal (T) that is cool or low (L) to send the data, but otherwise to obtain the data from the memory controller if none of the "shared" snoopers are cool, as indicated in the second row of the table listing 400. The master also updates its line state to "shared." In other embodiments, if none of the sharers is "cool", the Cresp message instructs the "shared" snoopers to update their line directory states as "invalid," and the master updates the line state to "exclusive" for the data sourced by the memory controller. In similar fashion, if a snooper returns an "exclusive" Presp message (N:e-T), the Cresp message instructs the snooper (N) to send the data if its thermal signal (T) is cool or low (L), but otherwise to obtain the data from the memory controller, as indicated in the fourth row of the table listing 400. In this case, the Cresp message further instructs the "exclusive" snooper to update its line directory state as "shared" and the master also updates its line state as "shared." In other embodiments, the Cresp message instructs the snooper (N) to update its line state as "invalid", and the master updates the line state to "exclusive" for the data sourced by the memory controller. Finally, if a snooper returns a "modified" Presp message (N:m-T), the Cresp message instructs the snooper to send the data and to update the snooper's line directory state as "invalid," as indicated by the "N:m_send_data_go_i" instruction in the third row of the table listing 400. In this case, the master updates its line state for the data to "modified." As seen in FIG. 4, the write requests may be handled similarly, except that if the line already exists as "modified" or "exclusive" in the requester, no request need be issued, and if it exists "shared" already, a Dclaim is issued on the fabric and all other sharers invalidate their copies. As seen from the foregoing, the thermal signals are only considered in the cases of shared or exclusive lines in other cores or memory in the system. In the cases of modified or invalid lines, only one external source is possible, either the core with the modified line or the memory controller, respectively.

Figure 5:
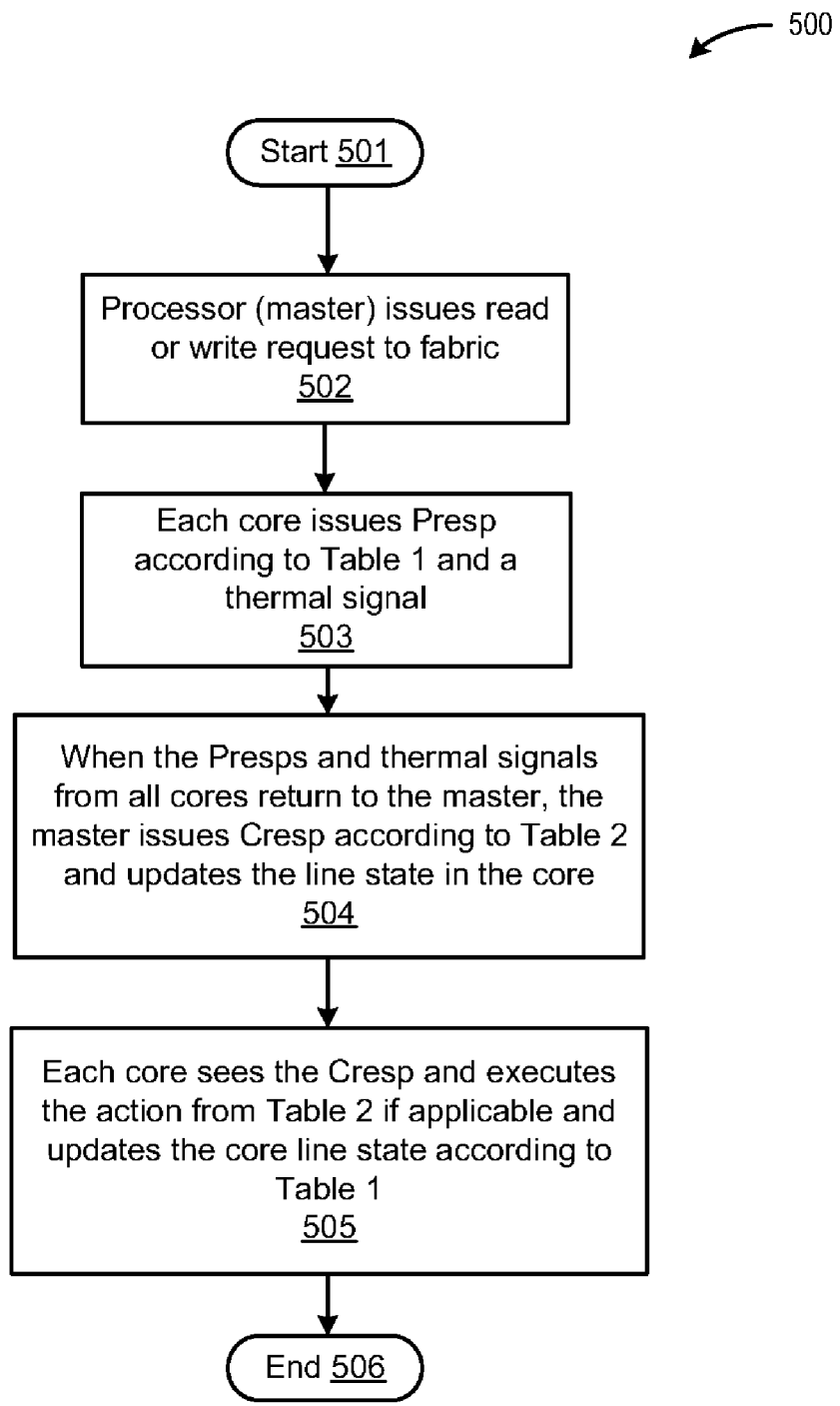
FIG. 5 is a logical flowchart of the snoop coherency protocol steps used to source a cache line to a requesting core from a plurality of memory sources in a multi-processor system based on the power or thermal conditions associated with the memory resources.

To further illustrate selected embodiments of the present invention, FIG. 5 is a logical flowchart of the snoop coherency protocol steps 500 used to source a cache line to a requesting core from a plurality of memory sources in a multi-processor system based on the power or thermal conditions associated with the memory resources. At step 501, the process starts, such as when a master core or processor is running a program that requires data from memory. When a memory access is required, the master core/processor issues a read or write request to the other cores/processors over a communication link, such as the fabric ring (step 502). In response, each core issues a response and also provides thermal signal information specifying the responding core's temperature or power dissipation status (step 503). For example, the response may take the form of a partial-response message such as set forth in the fourth column of Table 1. When the responses and thermal signal information from all responding cores are returned to the master core at step 504, the master core uses the received information to choose which responding core will provide the requested cache line by using the thermal signal information to choose from among the "cool" cores. The core chosen as the source is specified in a reply that is broadcast by the master core along with instructions for the receiving cores, at which time the master core updates its line state information. For example, the reply may take the form of a combined-response message such as set forth in the third column of Table 2. At step 505, each receiving core executes the instructions contained in the combined-response, thereby intervening the requested cache line from a low-power core or controller. In addition, each receiving core updates its corresponding line state information as applicable. For example, each receiving core may execute the action specified in the third column of Table 2 and then update the core line state according to the fifth column of Table 1. Once the line states are updated and the requested cache line is provided, the process ends (step 506) until another memory access is required.

As described herein, program instructions or code for sourcing a requested cache line from a low-power or "cool" memory source may execute on each core where a memory source is located and/or in a centralized location, such as a memory controller. For example, each cache memory (e.g., L1, L2, L3) and memory controller in a multiprocessor system may have its own programming instructions or code for monitoring its thermal or power dissipation status, and for distributing that status information to the appropriate control logic for use in selecting the low-power source for requested data. The control logic may be centrally located at a single location (such as a memory controller), or may be distributed throughout the multiprocessor system so that the control logic is shared.

The power-aware line intervention techniques disclosed herein for a multiprocessor data processing system use a snoop coherency protocol to source cache lines based on the temperature and/or power status of each cache memory. By snooping or sniffing a shared memory bus, every cache controller monitors the bus to detect cache line requests and broadcasts which may cause it to invalidate its cache line. As will be appreciated, the use of snoop coherency protocol techniques allows cache line requests to be provided quickly and efficiently since all transactions are seen by all processors/cache controllers as a request/response, thereby avoiding the latency delays associated with directory-based protocols.

As will be appreciated by one skilled in the art, the present invention may be embodied in whole or in part as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. For example, the functions of selecting a low power or low temperature memory source to intervene a requested cache line that is shared by a plurality of memory sources may be implemented in software that is stored in each candidate memory source or may be centrally stored in a single location.

The foregoing description has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification and example implementations provide a complete description of the manufacture and use of the composition of the invention. Since many embodiments of the invention can be made without departing from the spirit and scope of the invention, the invention resides in the claims hereinafter appended.

What is claimed is:

1. A method for intervening a shared cache line in a multiprocessor data processing system, comprising:
   generating a request from a master processor for a first cache line during operation of said multiprocessor data processing system;
   assembling at the master processor a plurality of partial responses from each of a plurality of memory sources which store a copy of the requested first cache line;
   collecting a temperature or power dissipation value for each of the plurality of memory sources;
   selecting a first memory source from the plurality of memory sources to intervene the requested first cache line, where the first memory source is selected at least in part based on having an acceptable temperature or power dissipation value; and
   broadcasting from the master processor a selection message to instruct the first memory source to intervene the requested first cache line to the master processor.

2. The method of claim 1, where selecting a first memory source comprises selecting a first memory source having a first temperature or power dissipation value that is lower than a second temperature or power dissipation value associated with a second memory source.

3. The method of claim 1, where selecting a first memory source comprises selecting a cool memory source based at least in part on comparing a first temperature or power dissipation value that is associated with the first memory source to one or more other temperature or power dissipation values associated with one or more other memory sources.

4. The method of claim 1, where the plurality of memory sources comprises a plurality of cache memories.

5. The method of claim 1, where each of the plurality of memory sources comprises a sensor for measuring a temperature or power dissipation value associated with said memory source.

6. The method of claim 4, where selecting a first memory source comprises selecting a memory controller having an acceptable temperature or power dissipation value to intervene the requested first cache line if none of the plurality of cache memories has an acceptable temperature or power dissipation value.

7. The method of claim 1, further comprising snooping at each of the plurality of memory sources for the request from the master processor.

8. The method of claim 1, where broadcasting from the master processor a selection message comprises instructing the plurality of memory sources to invalidate each respective copy of the requested first cache line when the request from the master processor comprises a request for exclusive access to the first cache line.

9. A computer-usable medium embodying computer program code, the computer program code comprising computer executable instructions configured for intervening a shared cache line in a multiprocessor data processing system by:
- generating a request from a master processor for a first cache line during operation of said multiprocessor data processing system;
- assembling at the master processor a plurality of partial responses from each of a plurality of memory sources which store a copy of the requested first cache line;
- collecting a temperature or power dissipation value for each of the plurality of memory sources;
- selecting a first memory source from the plurality of memory sources to intervene the requested first cache line, where the first memory source is selected at least in part based on having an acceptable temperature or power dissipation value; and
- broadcasting from the master processor a selection message to instruct the first memory source to intervene the requested first cache line to the master processor.

10. The computer-usable medium of claim 9, where selecting a first memory source comprises selecting a first memory source having a first temperature or power dissipation value that is lower than a second temperature or power dissipation value associated with a second memory source.

11. The computer-usable medium of claim 9, where selecting a first memory source comprises selecting a cool memory source based at least in part on comparing a first temperature or power dissipation value that is associated with the first memory source to one or more other temperature or power dissipation values associated with one or more other memory sources.

12. The computer-usable medium of claim 9, where the plurality of memory sources comprises a plurality of cache memories.

13. The computer-usable medium of claim 9, where each of the plurality of memory sources comprises a sensor for measuring a temperature or power dissipation value associated with said memory source.

14. The computer-usable medium of claim 12, where selecting a first memory source comprises selecting a memory controller having an acceptable temperature or power dissipation value to intervene the requested first cache line if none of the plurality of cache memories has an acceptable temperature or power dissipation value.

15. The computer-usable medium of claim 9, further comprising computer executable instructions configured for intervening a shared cache line in a multiprocessor data processing system by snooping at each of the plurality of memory sources for the request from the master processor.

16. The computer-usable medium of claim 9, where broadcasting from the master processor a selection message comprises instructing the plurality of memory sources to invalidate each respective copy of the requested first cache line when the request from the master processor comprises a request for exclusive access to the first cache line.

17. A multiprocessor data processing system comprising:
- a plurality of processors, each comprising one or more cache memories;
- a data bus coupled to the plurality of processors;
- a computer-usable medium embodying computer program code, the computer-usable medium being coupled to the data bus, the computer program code comprising instructions for intervening a shared cache line in a multiprocessor data processing system by:
  - generating a request from a master processor for a first cache line during operation of said multiprocessor data processing system;
  - assembling at the master processor a plurality of partial responses from each of a plurality of cache memories which store a copy of the requested first cache line;
  - collecting a temperature or power dissipation value for each of the plurality of cache memories;
  - selecting a first cache memory from the plurality of cache memories to intervene the requested first cache line, where the first cache memory is selected at least in part based on having an acceptable temperature or power dissipation value; and
  - broadcasting from the master processor a selection message to instruct the first cache memory to intervene the requested first cache line to the master processor.

18. The data processing system of claim 17, where selecting a first cache memory comprises selecting a first cache memory having a first temperature or power dissipation value that is lower than a second temperature or power dissipation value associated with a second cache memory.

19. The data processing system of claim 17, further comprising a sensor positioned at each cache memory for measuring a temperature or power dissipation value associated with said cache memory.

20. The data processing system of claim 17, where the sensor comprises a diode.

* * * * *